3,299,106
PROCESS FOR THE PREPARATION OF UNCON-
TAMINATED 17α - ETHYNYL - 19 - NOR - Δ⁴ - AN-
DROSTEN-17β-OL-3-ONE
Francisco Alvarez, Palo Alto, Calif., assignor to Syntex
 Corporation, Panama, Panama, a corporation of
 Panama
No Drawing. Filed Apr. 14, 1965, Ser. No. 447,968
Claims priority, application Mexico, June 1, 1964,
77,274
20 Claims. (Cl. 260—397.4)

This invention relates to a novel process for the preparation of cyclopentanopolyhydrophenanthrene derivatives.

More particularly, this invention relates to a novel process for obtaining 17α-ethynyl-19-nor-Δ⁴-androsten-17β-ol-3-one in pure form, uncontaminated by 19-nor-androstene-3,17-diones.

One satisfactory method for the preparation of 17α-ethynyl-19-nor-Δ⁴-androsten-17β-ol-3 - one ("Norlutin"), which is a potent oral progestational agent, involves the selective ethynylation of the 17-keto group in 19-nor-Δ⁴-androstene-3,17-dione, using, for example, acetylene and potassium t-butylate in benzene, with the reaction being controlled so as to stop it before the point is reached at which the 3-keto group is ethynylated. A parallel procedure involves the selective ethynylation of the 17-keto group in 19-nor-Δ⁵⁽¹⁰⁾-androstene-3,17-dione to give 17α-ethynyl-19-nor-Δ⁵⁽¹⁰⁾-androsten-17β-ol-3-one, also a potent oral progestational agent, which can then be rearranged in known manner, if desired, using a strong acid or base, to give 17α-ethynyl-19-nor-Δ⁴-androsten-17β-ol-3-one.

However, these procedures are not without certain drawbacks, chief among which perhaps is the fact that it is extremely difficult to separate 17α-ethynyl-19-nor-Δ⁴-androsten-17β-ol-3-one from the corresponding 3,17-dione starting material.

The present invention provides a practical solution to this problem by means of a process which not only permits the isolation of 17α-ethynyl-19-nor-Δ⁴-androsten-17β-ol-3-one in pure form from mixtures thereof with 19-nor-Δ⁴-androstene-3,17-dione, but also provides an efficient method of preparing 17α-ethynyl-19-nor-Δ⁴-androsten-17β-ol-3-one, in pure form, from 17α-ethynyl-19-nor-Δ⁵⁽¹⁰⁾-androsten-17β-ol-3-one which is contaminated with 19-nor-Δ⁵⁽¹⁰⁾-androstene-3,17-dione. This novel process can be illustrated schematically as follows:

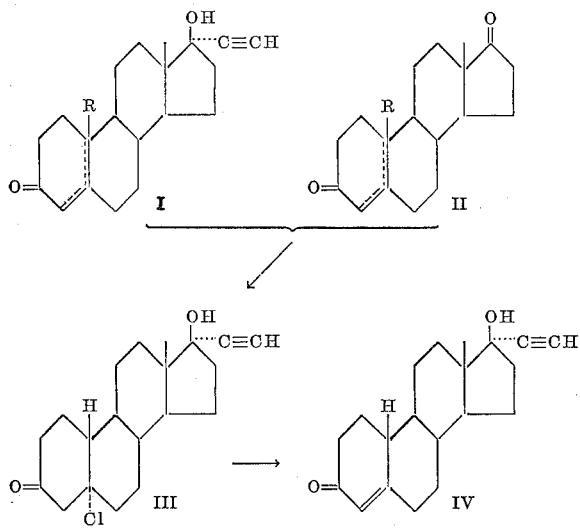

In these formulas the dotted lines in ring A of Formulas I and II indicate that a double bond is present between either the 4 and 5 or 5 and 10 carbon atoms, and R represents hydrogen when there is a double bond between carbon atoms 4 and 5 and indicates the absence of a substituent on the 10-carbon atom when there is a double bond between carbon atoms 5 and 10.

In practicing the above-illustrated process, the steroid starting material, i.e., a mixture containing at least one compound represented by each of Formulas I and II, such as a mixture containing 17α-ethynyl-19-nor-Δ⁴-androsten-17β-ol-3-one and 19-nor-Δ⁴-androstene-3,17-dione or a mixture containing 17α-ethynyl-19-nor-Δ⁵⁽¹⁰⁾-androsten-17β-ol-3-one and 19-nor-Δ⁵⁽¹⁰⁾-androstene-3,17-dione is dissolved in an organic solvent which is substantially inert to dry hydrogen chloride and preferably a substantially non-polar organic solvent, e.g., an aromatic hydrocarbon such as benzene, toluene or xylene, a chlorinated hydrocarbon such as methylene dichloride, chloroform, carbon tetrachloride or chlorobenzene, an ether such as diethyl ether, dioxane or tetrahydrofuran, or the like, as well as mixtures thereof, and then treated with substantially anhydrous hydrogen chloride to precipitate 5α-chloro-17α-ethynyl-19-nor-androstan-17β-ol-3-one (III) from the solution.

The hydrogen chloride can be added as a solution in one or more of the aforementioned solvents, or bubbled through the reaction sphere in gaseous form, or generated in situ, e.g., by the action of small amounts of moisture on phosgene, and will be present in at least the amount required to hydrochlorinate the double bond in the 17α-ethynyl-19-nor-Δ⁴-androsten-17β-ol-3-one and/or 17α-ethynyl-19-nor-Δ⁵⁽¹⁰⁾-androsten-17β-ol-3-one present.

This reaction will generally be carried out under substantially anhydrous conditions, although as noted hereinabove, moisture which will combine with another substance to generate hydrogen chloride can be present in amounts sufficient for this purpose. Reaction temperatures ranging from about −10° C. to about 30° C., and preferably from about 15° C. to about 25° C. (room temperature), will generally be used, although higher or lower reaction temperatures can also be employed, if desired, with only the rate of the reaction being affected. The reaction will usually be continued until no further precipitation of 5α-chloro-17α-ethynyl-19-nor-androstan-17β-ol-3-one takes place. For example, a reaction carried out at from about 15° C. to about 25° C. using dry hydrogen chloride gas, with anhydrous methylene dichloride as the solvent, will generally go to completion in about 20–30 minutes. Thus, the reaction conditions given hereinabove, other than the presence of a substantially inert organic solvent, are not critical, but merely represent the best mode of carrying out the invention known at the present time.

The discovery that this procedure gives selective hydrochlorination of 17α-ethynyl-19-nor-Δ⁴-androsten-17β-ol-3-one and 17α-ethynyl-19-nor-Δ⁵⁽¹⁰⁾-androsten-17β-ol-3-one to produce 5α-chloro-17α-ethynyl-19-nor-androstan-17β-ol-3-one, leaving the corresponding 3,17-diones unreacted, was entirely unexpected, and would not have been predicted from the structures of the compounds in question. And since the 5α-chloro compound precipitates, leaving the 3,17-diones in solution, a ready separation is effected. Furthermore, the 3,17-diones remaining in solution can be recycled to the ethynylation step, thus providing an even higher overall yield of the final product.

In the remaining essential step of the novel process of the present invention, the thus-obtained 5α-chloro-17α-ethynyl-19-nor-androstan-17β-ol-3-one is converted to 17α-ethynyl-19-nor-Δ⁴-androsten-17β-ol-3-one (IV). This can be accomplished by suspending the 5α-chloro compound in an alcoholic solution of a strong base, e.g., a 0.1–5% solution of an inorganic base such as lithium hydroxide, potassium hydroxide, sodium hydroxide, calcium hydroxide, or the like, in a lower alkanol such as methanol, ethanol or the like, and reacting the resulting suspension at a temperature of from about −5° C. to about 100° C., and preferably at from about 0° C. to about 60° C., for from about 30 minutes to about 7 hours.

A modification of the above-illustrated procedure can be used to selectively separate 17α-ethynyl-19-nor-Δ⁴-androsten-17β-ol-3-one from the reaction mixtures obtained by the Oppenauer oxidation of 17α-ethynyl-19-nor-Δ⁵⁽¹⁰⁾-androstene-3β,17β-diol, e.g., a mixture comprising unreacted 17α - ethynyl-19-nor-Δ⁵⁽¹⁰⁾-androstene-3β,17β-diol together with 17α-ethynyl-19-nor-Δ⁴-androsten-17β-ol-3 - one, 17α-ethynyl-19-nor-Δ⁵⁽¹⁰⁾-androsten-17β-ol-3-one, 19-nor-Δ⁴-androstene-3,17-dione and 19-nor-Δ⁵⁽¹⁰⁾-androstene-3,17-dione.

In carrying out this modification, the above described reaction mixture is first acylated, e.g., using an anhydride or a halide, such as the chloride, of a hydrocarbon carboxylic acid containing less than 12 carbon atoms, and preferably acetic anhydride or acetyl chloride, in an aromatic, heterocyclic tertiary amine, such as pyridine or the like, at room temperature for from about 12 to 18 hours or longer, e.g., overnight. This converts 17α-ethynyl-19-nor-Δ⁵⁽¹⁰⁾-androstene-3β,17β-diol to the corresponding 3-acylate, e.g., the 3-acetate.

The resulting mixture is then used as the starting material in the above-described hydrochlorination step, and 5α-chloro-17α-ethynyl-19-nor-androstan-17β-ol-3-one, obtained by hydrochlorination of both 17α-ethynyl-19-nor-Δ⁴-androsten-17β-ol-3-one and 17α-ethynyl-19-nor-Δ⁵⁽¹⁰⁾-androsten-17β-ol-3-one in the mixture, selectively precipitates leaving the remaining components of the mixture in solution, and is then treated in the manner described hereinabove to convert it to 17α-ethynyl-19-nor-Δ⁴-androsten-17β-ol-3-one.

In order that those skilled in the art can more fully inderstand the present invention, the following examples are set forth. These examples are given solely for the purpose of illustration, and should not be considered as expressing limitations unless so set forth in the appended claims:

EXAMPLE I

One hundred grams of a mixture of 17α-ethynyl-19-nor-Δ⁴-androsten-17β-ol-3-one and 19-nor-Δ⁴-androstene-3,17-dione (obtained by selectively ethynylating the 17-keto group in 19-nor-Δ⁴-androstene-3,17-dione, using acetylene and potassium t-amylate in benzene, and stopping the reaction at the point at which 70% of the 19-nor-Δ⁴-androstene-3,17-dione has been converted to 17α-ethynyl-19-nor-Δ⁴-androsten-17β-ol-3-one) were dissolved in 2 liters of anhydrous chloroform (distilled over calcium chloride) and then cooled to 5° C. on an ice-water bath. Next, a current of anhydrous hydrogen chloride gas was bubbled through the cooled solution at a rate of two liters per minute for 30 minutes. Following this reaction period, the resulting crystalline precipitate was collected by filtration, washed with fresh chloroform and then dried. Recrystallization from chloroform gave pure 5α-chloro-17α-ethynyl-19-nor-adnrostan-17β-ol-3-one, melting point 213–214° C. (with decomposition); $[\alpha]_D$ −24° (dioxane).

By repeating this procedure in every detail but one, namely, replacing chloroform successively with benzene, methylene dichloride, chlorobenzene and dioxane, 5α-chloro-17α-ethynyl-19-nor-androstan-17β-ol-3-one was obtained as the sole precipitated product.

Similarly, by using a mixture of 17α-ethynyl-19-nor-Δ⁵⁽¹⁰⁾ - androsten-17β-ol-3-one and 19-nor-Δ⁵⁽¹⁰⁾-androstene-3,17-dione (obtained by selectively ethynylating the 17-keto group in 19-nor-Δ⁵⁽¹⁰⁾-androstene-3,17-dione in the manner described hereinabove until 70% of the starting material had been ethynylated) as the steroid starting material, and replacing the stream of hydrogen chloride gas with 500 cc. of an anhydrous, saturated solution of hydrogen chloride in dioxane, 5α-chloro-17α-ethynyl-19-nor-androstan-17β-ol-3-one was obtained as the sole precipitated product.

EXAMPLE II

Twenty five grams of 5α-chloro-17α-ethynyl-19-nor-androstan-17β-ol-3-one were suspended in 1 liter of a 1% solution of potassium hydroxide in methanol, and the resulting suspension was refluxed for 30 minutes. Following this reaction period the reaction mixture was poured into 10 liters of ice water, and the resulting precipitate of 17α-ethynyl-19-nor-Δ⁴-androsten-17β-ol-3-one was collected by filtration, washed with water until neutral and then dried. Crystallization of this product from ethyl acetate gave pure 17α-ethynyl-19-nor-Δ⁴-androsten-17β-ol-3-one, melting point 204.5–206° C.;

$[\alpha]_D$ −35° (dioxane); $\lambda_{max.}^{MeOH}$ 240 m$\mu$, $E_{1cm.}^{1\%}$ 561–588

By repeating this procedure in every detail but one, namely using a 1% solution of sodium hydroxide rather than potassium hydroxide, the same pure product was obtained.

EXAMPLE III

A mixture of 1 grams of 17α-ethynyl-19-nor-Δ⁵⁽¹⁰⁾-androstene-3β,17β-diol, 10 ml. of toluene; 2 ml. of cyclohexanone and 200 mg. of aluminum isopropoxide was refluxed for 20 minutes, then poured into 100 cc. of water containing 3 cc. of glacial acetic acid. Next, the solvent were removed by steam distillation, and the remaining solution was extracted several times with methylene dichloride. The resulting extract was washed with an equeous 5% hydrochloric acid solution, then with water, then with an aqueous 10% sodium carbonate solution and finally with water until neutral. The neutral extract was then dried over anhydrous sodium sulfate and evaporated to dryness.

The thus-obtained dry residue was dissolved in a mixture of 1 cc. of acetic anhydride and 2 cc. of pyridine and allowed to stand at room temperature for 15 hours. Following this reaction period the reaction mixture was poured into water and stirred for 2 hours to hydrolyze any residual acetic anhydride. Next, the mixture was extracted with methylene dichloride and the resulting extract was washed with an aqueous 2.5% hydrochloric acid solution and then with water until neutral. The neutral extract was then dried over anhydrous sodium sulfate and evaporated to dryness.

The thus-obtained dry residue, comprising a mixture of 17α-ethynyl-19-nor-Δ⁵⁽¹⁰⁾-androstene-3β,17β-diol 3-acetate, 17α - ethynyl-19-nor-Δ⁵⁽¹⁰⁾-androsten-17β-ol-3-one, 17α - ethynyl-19-nor-Δ⁴-androsten-17β-ol-3-one, 19-nor-Δ⁵⁽¹⁰⁾-androstene-3,17-dione and 19-nor-Δ⁴-androstene-3,17-dione, was then treated in the manner described in Example I hereinabove, using gaseous hydrogen chloride in chloroform, and gave 5α-chloro-17α-ethynyl-19-nor-androstan-17β-ol-3-one as the sole precipitated product.

It will be obvious to those skilled in the art that other changes and variations can be made in carrying out the present invention without departing from the spirit and scope thereof as defined in the appended claims.

I claim:

1. A process for the preparation of 17α-ethynyl-19-nor-Δ⁴-androsten-17β-ol-3-one uncontaminated with 3,17-diones which comprises heating a solution containing at least one compound selected from the group consisting of 17α-ethynyl-19-nor-Δ⁴-androsten-17β-ol-3-one and 17α-ethynyl-19-nor-Δ⁵⁽¹⁰⁾-androsten-17β-ol-3-one and at least one compound selected from the group consisting of 19-nor-Δ⁴-androstene - 3,17 - dione and 19-nor-Δ⁵⁽¹⁰⁾-androstene-3,17-dione, in an organic solvent which is substantially inert to dry hydrogen chloride, under substantially anhydrous conditions, with hydrogen chloride to precipitate 5α-chloro-17α-ethynyl-19-nor-androstan-17β-ol-3-one, and contacting said 5α-chloro compound with an alcoholic solution of a strong base to give 17α-ethynyl-19-nor-Δ⁴-androsten-17β-ol-3-one.

2. A process according to claim 1 wherein said organic solvent is substantially non-polar.

3. A process according to claim 1 wherein said organic solvent is benzene.

4. A process according to claim 1 wherein said organic solvent is a chlorinated hydrocarbon.

5. A process according to claim 1 wherein said organic solvent is chloroform.

6. A process according to claim 1 wherein said organic solvent is an ether.

7. A process according to claim 1 wherein said organic solvent is dioxane.

8. A process for the preparation of 17α-ethynyl-19-nor-Δ$^4$-androsten-17β-ol-3-one uncontaminated with 19-nor-Δ$^4$-androstene-3,17-dione which comprises treating a solution containing said 17α-ethynyl compound and said 3,17-dione in a substantially non-polar organic solvent which is substantially inert to dry hydrogen chloride, under substantially anhydrous conditions, with hydrogen chloride to precipitate 5α-chloro-17α-ethynyl-19-nor-androstan-17β-ol-3-one, and contacting said 5α-chloro compound with an alcoholic solution of a strong base to give 17α-ethynyl-19-nor-Δ$^4$-androsten-17β-ol-3-one.

9. A process for the preparation of 17α-ethynyl-19-nor-Δ$^4$-androsten-17β-ol-3-one uncontaminated with 19-nor-Δ$^4$-androstene-3,17-dione which comprises treating a solution containing said 17α-ethynyl compound and said 3,17-dione in benzene, under substantially anhydrous conditions, with hydrogen chloride to precipitate 5α-chloro-17α-ethynyl-19-nor-androstan-17β-ol-3-one, and contacting said 5α-chloro compound with an alcoholic solution of a strong base to give 17α-ethynyl-19-nor-Δ$^4$-androsten-17β-ol-3-one.

10. A process for the preparation of 17α-ethynyl-19-nor-Δ$^4$-androsten-17β-ol-3-one uncontaminated with 19-nor-Δ$^4$-androstene-3,17-dione which comprises treating a solution containing said 17α-ethynyl compound and said 3,17-dione, in chloroform under substantially anhydrous conditions, with hydrogen chloride to precipitate 5α-chloro-17α-ethynyl - 19 - nor-androstan-17β-ol-3-one, and contacting said 5α-chloro compound with an alcoholic solution of a strong base to give 17α-ethynyl-19-nor-Δ$^4$-androsten-17β-ol-3-one.

11. A process for the preparation of 17α-ethynyl-19-nor-Δ$^4$-androsten-17β-ol-3-one uncontaminated with 19-nor-Δ$^4$-androstene-3,17-dione which comprises treating a solution containing said 17α-ethynyl compound and said 3,17-dione, in dioxane, under substantially anhydrous conditions, with hydrogen chloride to precipitate 5α-chloro-17α-ethynyl-19-nor-androstan-17β-ol-3-one, and contacting said 5α-chloro compound with an alcoholic solution of a stronge base to give 17α-ethynyl-19-nor-Δ$^4$-androsten-17β-ol-3-one.

12. A process for the preparation of 17α-ethynyl-19-nor-Δ$^4$-androsten-17β-ol-3-one uncontaminated with 19-nor-Δ$^{5(10)}$-androstene-3,17-dione which comprises heating a solution containing said 17α-ethynyl compound and said 3,17-dione, in a substantially non-polar organic solvent which is substantially inert to dry hydrogen chloride, under substantially anhydrous conditions, with hydrogen chloride to precipitate 5α-chloro-17α-ethynyl-19-nor-androstan-17β-ol-3-one, and contacting said 5α-chloro compound with an alcoholic solution of a strong base to give 17α-ethynyl-19-nor-Δ$^4$-androsten-17β-ol-3-one.

13. A process for the preparation of 17α-ethynyl-19-nor-Δ$^4$-androsten-17β-ol-3-one uncontaminated with 19-nor-Δ$^{5(10)}$-androstene-3,17-dione which comprises heating a solution containing said 17α-ethynyl compound and said 3,17-dione, in benzene, under substantially anhydrous conditions, with hydrogen chloride to precipitate 5α-chloro-17α-ethynyl-19-nor-androstan-17β-ol-3-one, and contacting said 5α-chloro compound with an alcoholic solution of a stronge base to give 17α-ethynyl-19-nor-Δ$^4$-androsten-17β-ol-3-one.

14. A process for the preparation of 17α-ethynyl-19-nor-Δ$^4$-androsten-17β-ol-3-one uncontaminated with 19-nor-Δ$^{5(10)}$-androstene-3,17-dione which comprises heating a solution containing said 17α-ethynyl compound and said 3,17-dione in chloroform, under substantially anhydrous conditions, with hydrogen chloride to precipitate 5α-chloro-17α-ethynyl - 19 - nor-androstan-17β-ol-3-one, and contacting said 5α-chloro compound with an alcoholic solution of a strong base to give 17α-ethynyl-19-nor-Δ$^4$-androsten-17β-ol-3-one.

15. A process for the preparation of 17α-ethynyl-19-nor-Δ$^4$-androsten-17β-ol-3-one uncontaminated with 19-nor-Δ$^{5(10)}$-androstene-3,17-dione which comprises heating a solution containing said 17α-ethynyl compound and said 3,17-dione, in dioxane, under substantially anhydrous conditions, with hydrogen chloride to precipitate 5α-chloro-17α-ethynyl-19-nor-androstan-17β-ol-3-one, and contacting said 5α-chloro compound with an alcoholic solution of a strong base to give 17α-ethynyl-19-nor-Δ$^4$-androsten-17β-ol-3-one.

16. A process for the preparation of 17α-ethynyl-19-nor-Δ$^4$-androsten-17β-ol-3-one uncontaminated with 3,17-diones which comprises acylating a pyridine solution of the Oppenauer oxidation products of 17α-ethynyl-19-nor-Δ$^4$-androstene-3β,17β-diol to convert unreacted 17α-ethynyl-19-nor-Δ$^4$-androstene-3β,17β-diol to the corresponding 3-acylate, dissolving the resulting acylated mixture in an organic solvent which is substantially inert to dry hydrogen chloride, treating the resulting solution, under substantially anhydrous conditions, with hydrogen chloride to precipitate 5α-chloro-17α-ethynyl-19-nor-androstan-17β-ol-3-one, and contacting said 5α-chloro compound with an alcoholic solution of a strong base to give 17α-ethynyl-19-nor-Δ$^4$-androsten-17β-ol-3-one.

17. A process for the preparation of 17α-ethynyl-19-nor-Δ$^4$-androsten-17β-ol-3-one uncontaminated with 3,17-diones which comprises acetylating a pyridine solution of the Oppenauer oxidation products of 17α-ethynyl-19-nor-Δ$^4$-androstene-3β,17β-diol to convert unreacted 17α-ethynyl-19-nor-Δ$^4$-androstene-3β,17β-diol to the corresponding 3-acetate, dissolving the resulting acylated mixture in a substantially non-polar organic solvent which is substantially inert to dry hydrogen chloride, heating the resulting solution, under substantially anhydrous conditions, with hydrogen chloride to precipitate 5α-chloro-17α-ethynyl-19-nor-androstan-17β-ol-3-one, and contacting said 5α-chloro compound with an alcoholic solution of a strong base to give 17α-ethynyl-19-nor-Δ$^4$-androsten-17β-ol-3-one.

18. A process according to claim 17 wherein said organic solvent is benzene.

19. A process according to claim 17 wherein said organic solvent is chloroform.

20. A process according to claim 17 wherein said organic solvent is dioxane.

No references cited.

LEWIS GOTTS, *Primary Examiner.*

H. FRENCH, *Assistant Examiner.*